United States Patent [19]
Volay et al.

[11] Patent Number: 6,049,389
[45] Date of Patent: Apr. 11, 2000

[54] METHOD AND APPARATUS FOR READING RELIEF CARRIED ON A TRANSPARENT OR TRANSLUCENT RECEPTACLE

[75] Inventors: Philippe Volay, Ecully; Marc Leconte, Sainte Colombe Les Vienne; Jean Francois Garin, Lyons, all of France

[73] Assignee: BSN (Societe Anonyme), France

[21] Appl. No.: 09/118,930

[22] Filed: Jul. 20, 1998

[51] Int. Cl.⁷ .................................................. G01N 21/55
[52] U.S. Cl. .................... 356/445; 356/445; 356/382; 356/376
[58] Field of Search ................................. 356/445, 382, 356/376, 372

[56] References Cited

U.S. PATENT DOCUMENTS

| | | | |
|---|---|---|---|
| 5,666,194 | 9/1997 | Deuton | 356/72 |
| 5,724,140 | 3/1998 | Haywood | 356/371 |
| 5,835,225 | 11/1998 | Thakur | 356/381 |

*Primary Examiner*—Frank G. Font
*Assistant Examiner*—Reginald A. Ratiff
*Attorney, Agent, or Firm*—Bacon & Thomas PLLC

[57] ABSTRACT

The invention provides a method of optically reading relief carried by the outside wall of a transparent or translucent receptacle. The method of the, invention consists:

in illuminating the receptacle by means of an incident light cone supplied by a lighting system placed beneath the receptacle;

in adjusting the width of the incident light cone to limit lighting at least to the portion of the outside wall that is provided with relief in order to avoid parasitic reflections;

in picking up the reflected light beams by means of the pick-up element disposed beneath the receptacle and suitable for forming a plane image of the wall of the bottle; and in adjusting the field angle of the pick-up element as a function of the characteristics of the receptacle.

13 Claims, 2 Drawing Sheets

METHOD AND APPARATUS FOR READING RELIEF CARRIED ON A TRANSPARENT OR TRANSLUCENT RECEPTACLE

FIELD OF THE INVENTION

The present invention relates to the technical field of opto-electronic inspection of objects, hollow articles, or receptacles, such as, for example, bottles or flasks, of transparent or translucent nature, for the purpose of reading relief in the wide sense, formed on the outside walls of such receptacles.

More particularly, the invention seeks to read the mold number written on the bottom margin of a glass bottle, in the form of a code made up of beads or elements in relief.

BACKGROUND OF THE INVENTION

In the preferred field of application of the invention, it is known to read the mold number carried by a bottle, for example for the purposes of associating defects detected by sensors with the number of the faulty mold, of automatically rejecting bottles manufactured using a faulty mold, and of automatically extracting bottles coming from one or more molds, in particular for sampling purposes. Another advantageous application for the subject matter of the invention lies in the field of sorting bottles, whether empty or full, by mold number.

In the state of the art, it is known to use a reader device placed on a bottle conveyor line. Given the random positioning of bottles on a conveyor line, it is necessary to turn each bottle about its vertical axis in front of the reader device so as to scan the entire periphery of the bottom margin of the bottle in order to read the relief corresponding to a mold number.

The major drawback with that technique lies in rotating each bottle. As a result, there is a risk of damaging the outside wall of the bottle because of the rotary drive mechanism rubbing there against. In addition, rotating bottles reduces inspection rate compared with other inspection operations that are performed straight through, i.e. without interfering with the process of moving the bottles in translation.

In an attempt to remedy the drawbacks of that technique, French patent application FR 2 747 211 proposes an opto-electronic reader device having a light source which illuminates all of the periphery of a portion of the body of the receptacle.

The light source is constituted by two elements disposed on either side of the conveyor, level with the bottom margin of the bottle. The device also has two frustoconical mirrors disposed on either side of the conveyor level with the body of the bottle and adapted to receive light reflected by the bottle and to transmit the light to a camera placed above the bottle. The camera is associated with an electronic processing system capable of reproducing a complete image of the zone of the bottle that includes the mold number.

Although such a relief reader device is designed to avoid any need for rotating bottles, it has to be understood that implementing such a device leads to the appearance of parasitic reflections that reduce image contrast, such that relief is buried in background noise making it difficult to read. In addition, implementing two mirrors on either side of the conveyor does not suffice to recover all of the beams reflected over the entire periphery of the bottle. To remedy that drawback, the above patent application proposes using four mirrors, thus requiring receptacles to be handled in a special manner and reducing the inspection rate.

OBJECT AND SUMMARY OF THE INVENTION

The object of the invention is thus to remedy the above-specified drawbacks by proposing a method adapted to ensuring that relief carried by the outside wall of a transparent or translucent receptacle is read optically while performing no handling operations on the receptacles, and while also presenting optimized read efficiency.

To achieve this object, the present invention provides a method of optically reading relief carried by the outside wall of a transparent or translucent receptacle, the method being of the type consisting:

in illuminating the outside wall of the receptacle around its periphery with an incident light beam;

in using a pick-up element to pick up the light beams reflected by the receptacle in order to transmit them to a receiver system; and in processing the light beams received by the receiver system in order to identify relief.

According to the invention, the method consists:

in illuminating the receptacle by means of an incident light cone supplied by a lighting system placed beneath the receptacle;

in adjusting the width of the incident light cone to limit lighting at least to the portion of the outside wall that is provided with relief in order to avoid parasitic reflections;

in picking up the reflected light beams by means of the pick-up element disposed beneath the receptacle and suitable for forming a plane image of the wall of the bottle; and in adjusting the field angle of the pick-up element as a function of the characteristics of the receptacle.

The invention also seeks to provide apparatus for optically reading relief carried by the outside wall of a transparent or translucent receptacle, the apparatus being of the type comprising:

a lighting system suitable for supplying an incident light beam illuminating the periphery of the outside wall of the receptacle;

a receiver system for receiving light beams reflected by the receptacle and picked up by a pick-up element interposed between the receptacle and the receiver system; and an analysis and processing unit for analyzing and processing the light beams received by the receiver system for the purpose of identifying relief.

According to the invention, the apparatus comprises:

a lighting system placed beneath the receptacle and supplying an incident light cone; and a pick-up element disposed beneath the receptacle and suitable for forming a plane image of the illuminated wall of the bottle.

BRIEF DESCRIPTION OF THE DRAWINGS

Various other characteristics appear from the following description given with reference to the accompanying drawings, which show embodiments and implementations of the invention as non-limiting examples.

MORE DETAILED DESCRIPTION

Figure 1:
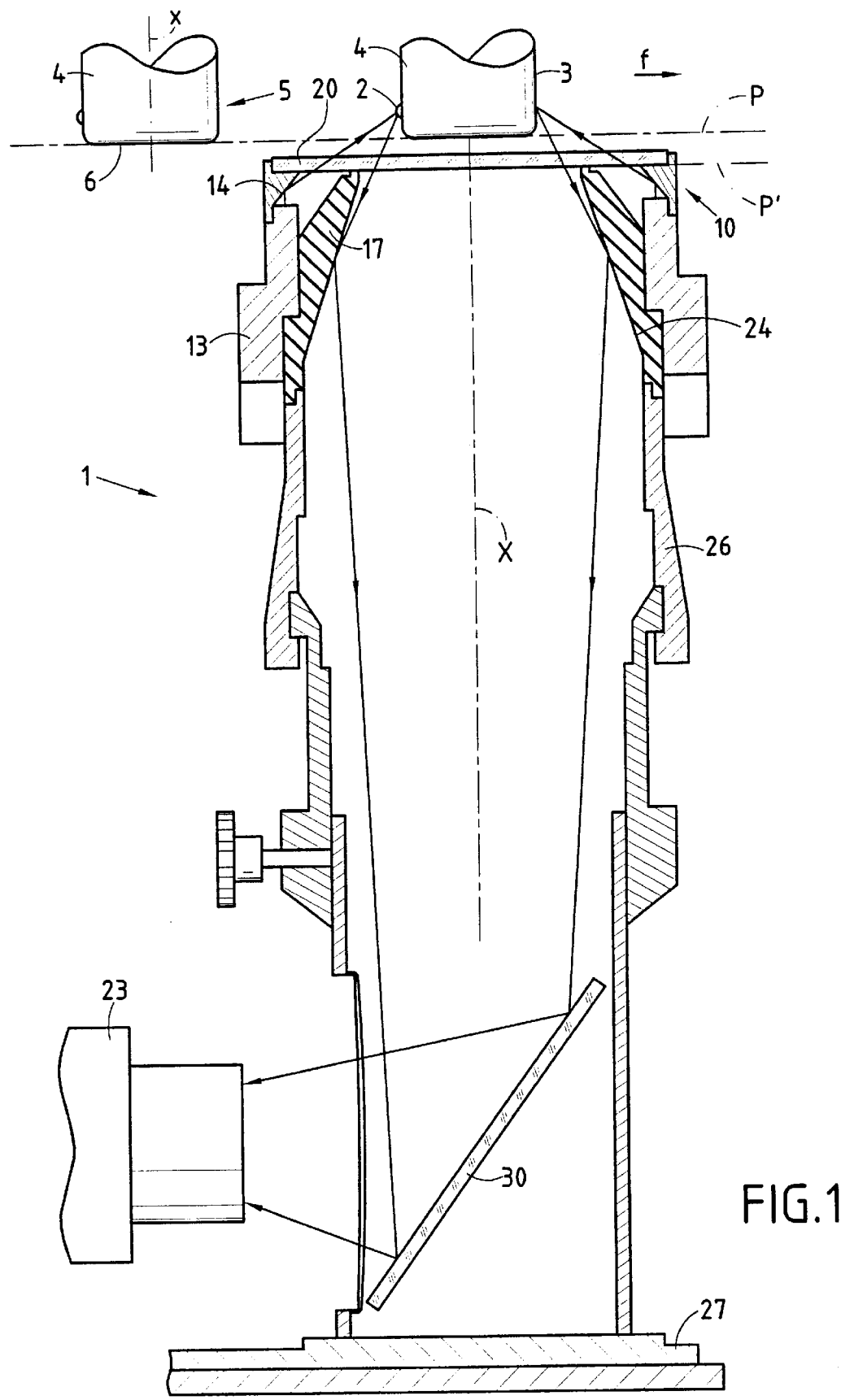
FIG. 1 is a section and elevation view of an embodiment of optical read apparatus of the invention.

FIG. 1 shows an embodiment of apparatus 1 adapted to read beads or relief 2 carried on the outside wall 3 of a transparent or translucent hollow object or receptacle 4 in the general sense. In a preferred embodiment, the receptacle 4 is a bottle whose bottom margin 5 carries relief or beads 2 constituting a code corresponding to the number of the mold used for making said bottle. In conventional manner, each bottle 4 is moved in translation by a handling system (not shown but known per se) in the direction of arrow f, such that the bottoms 6 of the bottles 2 define a bottom travel plane P. As they move in translation, the bottles 4 are brought one by one to a position where the vertical axis of symmetry x of each bottle coincides with the axis of symmetry X of the read apparatus 1.

Figure 2:
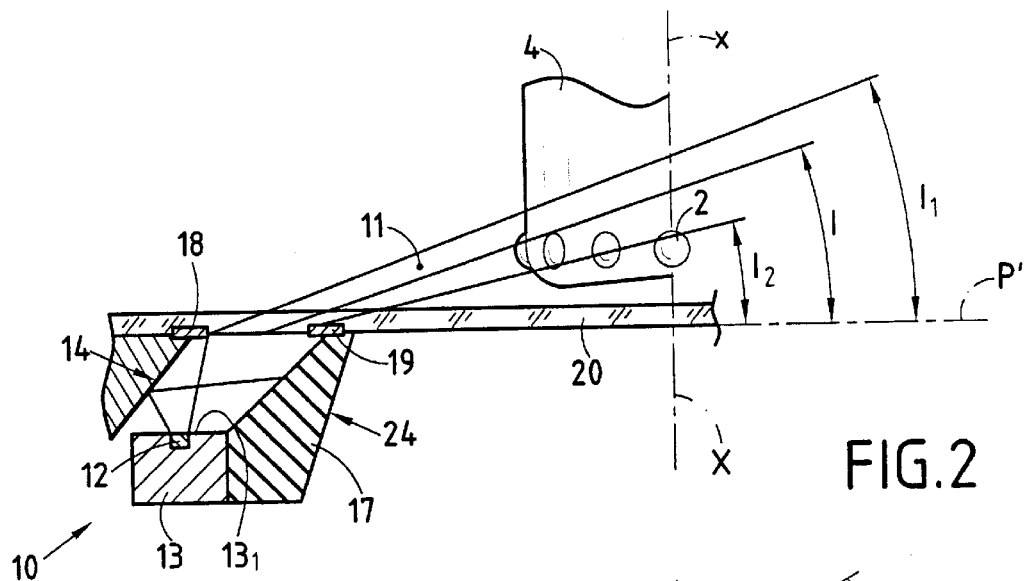
FIG. 2 is a diagram showing an embodiment of a lighting system implemented in the apparatus of the invention.

The read apparatus 1 of the invention comprises a lighting system 10 suitable for delivering an incident light beam illuminating the outside wall 3 of the bottle around its periphery. In accordance with the invention, the lighting system 10 is placed beneath the bottle 4, i.e. below the bottom travel plane P so as to avoid interfering with the travel of the bottles. As can be seen more clearly in FIG. 2, the lighting system 10 is adapted to deliver an incident light cone 11 for illuminating the entire periphery of the bottom margin 5 of a bottle. The lighting system 10 comprises a light source 12 such as an annular optical fiber mounted inside a sleeve 13 for delivering an annulus of light from the top face 13, of the sleeve. The lighting system 10 also includes a frustoconical lighting mirror ii placed above the sleeve 13 to pick up the light beams emitted by the light source 12. The lighting mirror 14 is in the form of a hollow frustoconical element that is circularly symmetrical about the axis of symmetry X. The lighting mirror 14 is inclined by being oriented towards the top face $13_1$ of the sleeve, so that the light beam emitted by the mirror has an incident angle of illumination I measured relative to a plane P' parallel to the travel plane P lying in the range 5° to 25°. As can be seen from FIG. 1, the lighting mirror 14 delivers an incident light code 11 which is defined on the outside by its top edge and on the inside by the top edge of a circularly symmetrical ring 17. The top edges of the lighting mirror 14 and of the circular ring 17 lie in a common plane P' and between them they deliver a gap defining a maximum value for the incident cone 11.

According to a preferred characteristic of the invention, the lighting system 10 has means for adjusting the width of the incident light cone 11 so as to limit illumination to that portion of the bottom margin 5 which carries the relief 2. This can be seen more clearly in FIG. 2 where the lighting cone 11 is defined on the outside by a top angle $I_1$ and on the inside by an bottom angle $I_2$, said angles being measured relative to the plane P". According to a characteristic, the adjustment means serve to reduce the top angle $I_1$ of the lighting cone 11 so as to avoid light being reflected on the top of the opposite wall of the bottle. According to another characteristic of the invention, the adjustment means enable the bottom angle $I_2$ to be increased so as to avoid parasitic reflections due to the bottom of the bottle. Advantageously, the means for adjusting the width of the lighting cone 11 are constituted by masks 18 and 19 in the form of opaque rings for mounting inside rabbets formed at the top edges respectively of the mirror 14 and of the ring 17. In this way, mask ring 18 serves to mask light rays having an angle of incidence greater than the angle $I_1$, while the mask ring 19 masks light rays having an angle of incidence less than the angle $I_2$. Each mask ring 18 and 19 is of a given diameter and of a width that is determined to set the top angle and/or the bottom angle of the lighting cone to a given value. According to a preferred embodiment characteristic, the lighting device 10 is fitted with a protective glass 20 placed above the lighting mirror 14 to avoid any damage or dirtying. The protective glass 20 is in contact with the mirror 14 and the ring 17 so as to avoid parasitic reflections. The protective glass 20 thus bears against the mask rings 18 and 19.

In accordance with the invention, the lighting system 10 provides a lighting cone 11 which illuminates the bottom margin 5 around its entire periphery over a limited zone which includes the relief 2 that is to be read. Such lighting causes light to be reflected from the relief 2, which light needs to be picked up.

The read apparatus 1 of the invention thus includes a system 23 for receiving light beams reflected by the system and picked up by an optical element 24 interposed between the bottle 4 and the receiver system 23. For example, the receiver system 23 can be a CCD matrix camera fitted with a standard lens having a focal length of 8 mm or 10 mm. In accordance with the invention, the optical element 24 is disposed beneath the bottle 4, i.e. beneath the bottom travel plane P of the bottles. The optical element 24 is designed to form a plane image of the illuminated peripheral wall of the bottle. As can be seen more clearly in FIG. 3, the optical element 24 in the example shown is constituted by a frustoconical light mirror which is preferably formed on the circular ring 17, on the inside face thereof. The pick-up mirror 24 is thus frustoconical in shape about the axis of symmetry X.

Figure 3:
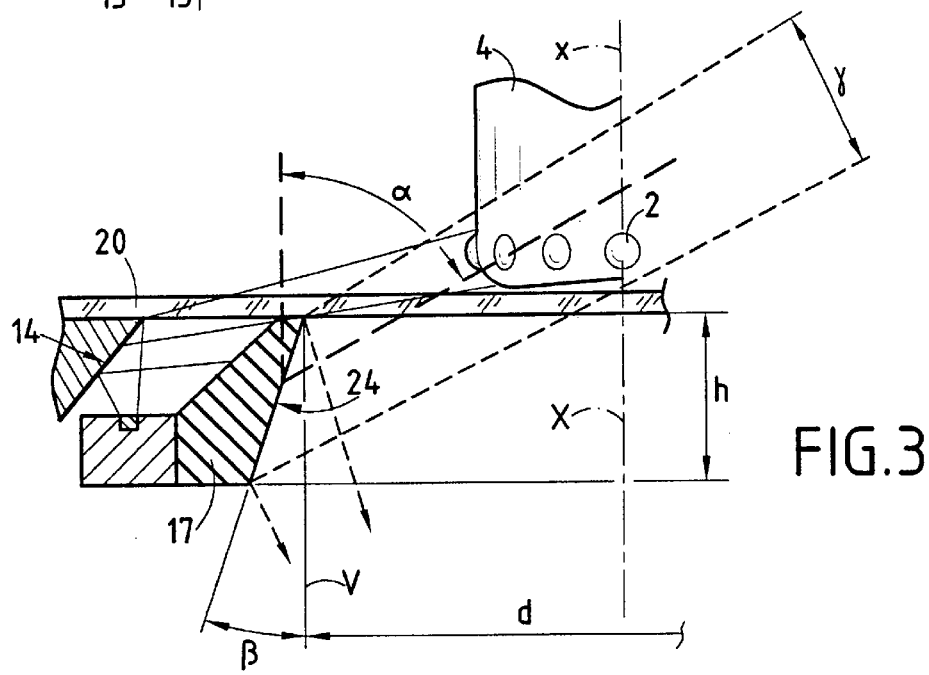
FIG. 3 is a diagram showing an implementation of a receiver system implemented in the read apparatus of the invention.

In the preferred embodiment shown in FIG. 3, the circular pick-up mirror 24 is mounted concentrically inside the lighting mirror 14 so that one .is nested inside the other. The pick-up mirror 24 is fitted on a series of superposed rings 26 of adjustable height supported on a stand 27. The pick-up mirror 24 is designed to support the outside of the sleeve 13 provided with the light source 12.

The pick-up mirror 24 slopes in the same direction as the lighting mirror 14, such that the large base of the pick-up mirror 24 is situated below its small base. The pick-up mirror 24 thus has an angle of inclination β relative to the vertical V parallel to the axis of symmetry X. The pick-up mirror 24 has a height h and an inside diameter d at its small base.

It should be assumed that the pick-up mirror 24, also referred to as the "observation cone", is adapted to give a field of view (corresponding to a field angle γ) that makes it possible to see the relief 2. In addition, the pick-up mirror 24 is adapted to present an observation angle a making it possible to pick up light reflected from the relief 2. The observation angle α is defined between the vertical V and the direction of incidence of the pick-up mirror 24. It should also be assumed that the field of view of the camera depends on the size of the CCD and on the focal length of its lens, thereby determining the magnification of the image and also the diameter d and the height h of the observation cone 24, with these two parameters defining the proportions of the image that is taken of the bottom margin. The observation angle α of the pick-up cone 24 must be determined as a function of the slope of the margin 5 and of the projecting positioning degree of the relief 2. Thus, the larger the angle α, the better the relief 2 is observed, even when the relief projects little. However, under such circumstances, the detection system is more sensitive to variations in the thickness of the bottoms of the bottles. Thus, the angle α may lie in the range 20° to 45°. To this end, since the observation angle α depends on the angle β of the observation cone, pick-up mirrors 24 are provided in a range having different values for the angle β. For example, a series of four pick-up mirrors 24 may be provided, having respective angles α equal to 19°, 25°, 30°, and 35°. Naturally, each pick-up mirror 24 has a diameter d and a height h which are adapted to the diameter of the bottle 4.

The light picked up by the pick-up mirror 24 is transmitted directly to the camera 23 (or as shown in FIG. 1, via a deflector mirror 30, since in this case the camera 23 is placed laterally relative to the vertical axis of symmetry X). Naturally, the camera 23 could be aligned on the axis X. In general, it should be assumed that the camera is advantageously placed below the travel plane P.

Figure 4:
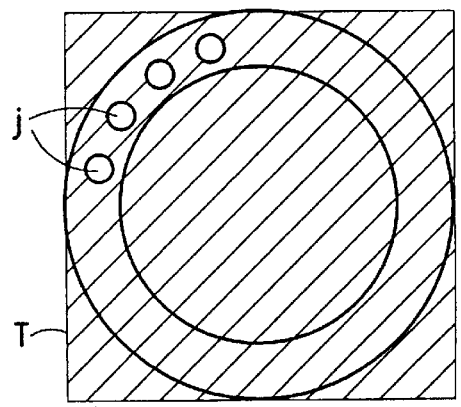
FIG. 4 shows an example of an image obtained from the read apparatus of the invention.

The camera 23 is provided with a unit (not shown) for analyzing and processing the received light beam. By way of example, FIG. 4 shows an image T as received by the camera 23. The received image T has a ring corresponding to the margin and in the ring there appears information i corresponding to the relief 2. The analysis and processing unit thus scans the inside of the ring to identify the relief, and then to determine the mold number.

Implementation of the read apparatus 1 of the invention flows directly from the above description.

It should be observed that the reader apparatus 1 of the invention is installed on the path along which bottles are conveyed without requiring any modification to the conveyor system, given that the reader apparatus is integrated beneath the bottom travel plane P of the bottles. In addition, depending on the shape and the dimensions of the bottles to be inspected, the width of the lighting cone 11 is determined so as to illuminate only the margin carrying the relief 2. In this respect, the lighting system 10 is optionally fitted with an inside and/or outside masking ring 19 and/qr 18. Ring selection is made from a set of masking rings 18 and 19 of different widths and different diameters.

Similarly, provision is made to adjust or determine the field angle γ of the camera as a function of the shape and dimensional characteristics of the receptacles. In the example shown, the field angle γ is determined by selecting an observation mirror 24 of determined height h, diameter d, and inclination angle β. This selection is made in a range of several observation mirrors 24 each having different characteristics.

Naturally, images are taken when the axis of symmetry x of a bottle is in alignment with the axis of symmetry X of the read apparatus. The image taken by the camera 23 is then processed to read the relief 2.

The invention is not limited to the examples described and shown since various modifications can be made thereto without going beyond its ambit. Thus, provision can be made to replace the frustoconical pick-up mirror with a prism that performs the functions as described above.

We claim:

1. A method of optically reading relief carried by the outside wall of a transparent or translucent receptacle, the method including the steps of:

illuminating the outside wall of the receptacle around its periphery with an incident light beam;

using a pick-up element to pick up the light beams reflected by the receptacle in order to transmit them to a receiver system;

processing the light beams received by the receiver system in order to identify relief;

wherein the step of illuminating the outside wall of the receptacle is carried out by means of an incident light cone supplied by a lighting system placed beneath the receptacle;

adjusting the width of the incident light cone to limit lighting at least to the portion of the outside wall that is provided with relief in order to avoid parasitic reflections;

picking up the reflected light beams by means of the pick-up element disposed beneath the receptacle and suitable for forming a plane image of the wall of the bottle; and adjusting the field angle of the pick-up element as a function of the characteristics of the receptacle.

2. A method according to claim 1, comprising adjusting the width of the incident light cone by using one or more masking rings reducing the outside angle or the inside angle of the incident light cone.

3. A method according to claim 1, comprising adjusting the field angle of the pick-up element by varying the angle of the pick-up element.

4. A method according to claim 3, comprising adjusting the field angle of the pick-up element by selecting a pick-up element having a circularly symmetrical cone with a determined angle, said element being selected from a range of elements.

5. Read apparatus for optically reading relief carried by the outside wall of a transparent or translucent receptacle, the apparatus comprising:

a lighting system suitable for supplying an incident light beam illuminating the periphery of the outside wall of the receptacle;

a receiver system for receiving light beams reflected by the receptacle and picked up by a pick-up element interposed between the receptacle and the receiver system;

an analysis and processing unit for analyzing and processing the light beams received by the receiver system for the purpose of identifying relief;

a lighting system placed beneath the receptacle and supplying an incident light cone; and a pick-up element disposed beneath the receptacle and suitable for forming a plane image of the illuminated wall of the bottle.

6. Apparatus according to claim 5, including adjustment means for adjusting the width of the incident light cone to limit illumination to at least the portion of the outside wall that is provided with relief so as to avoid parasitic reflections.

7. Apparatus according to claim 6, wherein the means for adjusting the width of the incident light cone are constituted by a series of masking rings adapted to reduce the outside angle or the inside angle of the incident light cone.

8. Apparatus according to claim 5, wherein said pick-up element comprises a circular optical cone of determined observation angle.

9. Apparatus according to claim 5, including means for adjusting the field angle of the pick-up element as a function of the characteristics of the receptacle.

10. Apparatus according to claim 9, wherein the means for adjusting the field angle is constituted by a cone selected from a range of cones having mutually different observation angles.

11. Apparatus according to claim 5, wherein the lighting system includes a lighting optical cone placed relative to a light ring.

12. Apparatus according to claim 11, including a transparent protective plate mounted in contact with the lighting optical cone.

13. Apparatus according to claim 12, wherein said pick-up element comprises a circular optical cone of determined observation angle, and wherein the pick-up cone is mounted on a ring and is arranged to support the lighting optical cone in concentric manner.

* * * * *

UNITED STATES PATENT AND TRADEMARK OFFICE
CERTIFICATE OF CORRECTION

PATENT NO. : 6,049,389
DATED : April 11, 2000
INVENTOR(S) : Philippe Volay et al.

Page 1 of 1

It is certified that error appears in the above-identified patent and that said Letters Patent is hereby corrected as shown below:

Cover page, insert --item [30]; Priority No. 98 08 356, France, June 26, 1998--

Signed and Sealed this

Twenty-sixth Day of June, 2001

*Attest:*

NICHOLAS P. GODICI
*Attesting Officer*     *Acting Director of the United States Patent and Trademark Office*